(12) United States Patent
Scanish

(10) Patent No.: US 10,731,057 B2
(45) Date of Patent: Aug. 4, 2020

(54) PRESSURE-SENSITIVE PVC COVER STRIP

(71) Applicant: Carlisle Intangible Company, Scottsdale, AZ (US)

(72) Inventor: Michael J. Scanish, Camp Hill, PA (US)

(73) Assignee: Carlisle Intangible, LLC, Scottsdale, AZ (US)

( * ) Notice: Subject to any disclaimer, the term of this patent is extended or adjusted under 35 U.S.C. 154(b) by 0 days.

(21) Appl. No.: 15/992,475

(22) Filed: May 30, 2018

(65) Prior Publication Data

US 2018/0346765 A1    Dec. 6, 2018

Related U.S. Application Data

(60) Provisional application No. 62/514,173, filed on Jun. 2, 2017.

(51) Int. Cl.
*C09J 7/50* (2018.01)
*C09J 7/29* (2018.01)
(Continued)

(52) U.S. Cl.
CPC ............... *C09J 7/50* (2018.01); *B32B 27/22* (2013.01); *B32B 27/304* (2013.01); *C09J 7/245* (2018.01); *C09J 7/29* (2018.01); *C09J 7/383* (2018.01); *C09J 7/401* (2018.01); *E04D 5/10* (2013.01); *C09J 123/22* (2013.01); *C09J 2201/606* (2013.01); *C09J 2409/001* (2013.01); *C09J 2413/001* (2013.01); *E04D 5/12* (2013.01); *E04D 2013/0468* (2013.01)

(58) Field of Classification Search
CPC .................................................... B32B 27/304
See application file for complete search history.

(56) References Cited

U.S. PATENT DOCUMENTS 3,669,717 A    6/1972   Akamatsu
3,892,895 A    7/1975   Toogoo et al.
(Continued)

FOREIGN PATENT DOCUMENTS

BE       613220 A      5/1962
CA     2099104 A1    12/1993
(Continued)

OTHER PUBLICATIONS

European Patent Office, Extended European Search Report in corresponding European Patent Application No. 18175604.0 dated Feb. 1, 2019.
(Continued)

*Primary Examiner* — Alexandre F Ferre
(74) *Attorney, Agent, or Firm* — Wood Herron & Evans LLP

(57) ABSTRACT

A PVC-based cover strip designed to bond to non-PVC materials as well as PVC materials includes a PVC layer coated with a barrier effective to prevent migration of plasticizers from the PVC layer. The barrier layer, in turn, is coated with a primer and subsequently a pressure-sensitive adhesive. The barrier layer is generally a polar polymer, such as acrylonitrile rubber which resists migration of phthalate plasticizers. The pressure-sensitive adhesive layer is a pressure-sensitive adhesive suitable for use in roofing applications.

12 Claims, 1 Drawing Sheet

(51) Int. Cl.
*C09J 123/22* (2006.01)
*B32B 27/04* (2006.01)
*B32B 27/22* (2006.01)
*C09J 7/38* (2018.01)
*C09J 7/40* (2018.01)
*E04D 5/10* (2006.01)
*B32B 27/30* (2006.01)
*C09J 7/24* (2018.01)
*E04D 13/04* (2006.01)
*E04D 5/12* (2006.01)

(56) References Cited

U.S. PATENT DOCUMENTS

| | | | |
|---|---|---|---|
| 4,045,600 A | 8/1977 | Williams | |
| 4,074,014 A | 2/1978 | Wollen | |
| 4,175,156 A | 11/1979 | Ikins | |
| 4,806,393 A | 2/1989 | Levin | |
| 5,063,106 A | 11/1991 | Nieuwenhuize et al. | |
| 5,069,964 A | 12/1991 | Tolliver et al. | |
| 5,104,741 A | 4/1992 | Greenlee et al. | |
| 5,227,592 A | 7/1993 | Kosters et al. | |
| 5,731,042 A | 3/1998 | Glende et al. | |
| 6,235,363 B1 | 5/2001 | Bilodeau | |
| 6,544,697 B2 | 4/2003 | Cunningham Thomson et al. | |
| 7,199,183 B2 | 4/2007 | Okuyama et al. | |
| 7,858,681 B2 | 12/2010 | McAllister et al. | |
| 7,900,413 B2 | 3/2011 | Stanley | |
| 8,795,827 B2 | 8/2014 | Siche | |
| 9,097,018 B2 | 8/2015 | Jendoubi et al. | |
| 9,284,733 B2 | 3/2016 | Slongo et al. | |
| 9,404,268 B2 | 8/2016 | Barksdale et al. | |
| 9,428,912 B2 | 8/2016 | Jendoubi et al. | |
| 9,528,268 B2 | 12/2016 | Hubbard | |
| 2006/0251890 A1* | 11/2006 | Lane | C09J 7/38 428/343 |
| 2007/0224414 A1 | 9/2007 | Leonard et al. | |
| 2008/0038548 A1* | 2/2008 | Clarke | E04D 5/148 428/343 |
| 2010/0200148 A1 | 8/2010 | Douglas | |
| 2011/0056620 A1* | 3/2011 | Barksdale | B32B 7/06 156/247 |
| 2011/0079332 A1 | 4/2011 | Parla et al. | |
| 2011/0198023 A1 | 8/2011 | Tippins et al. | |
| 2012/0102873 A1 | 5/2012 | Rust et al. | |
| 2013/0098429 A1* | 4/2013 | Funayama | H01L 31/0481 136/251 |
| 2014/0220336 A1 | 8/2014 | Chen et al. | |
| 2015/0035204 A1 | 2/2015 | Stoner et al. | |
| 2016/0145406 A1* | 5/2016 | Bieber | C09J 7/10 521/91 |

FOREIGN PATENT DOCUMENTS

| | | |
|---|---|---|
| CA | 2201258 A1 | 10/1997 |
| EP | 1443158 A1 | 8/2004 |
| EP | 1769907 A1 | 4/2007 |
| EP | 2581944 A1 | 4/2013 |

OTHER PUBLICATIONS

European Patent Office, Partial European Search Report in corresponding European Patent Application No. 18175604.0 dated Nov. 6, 2018.

* cited by examiner

PRESSURE-SENSITIVE PVC COVER STRIP

CROSS-REFERENCE TO RELATED APPLICATION

This application claims the benefit of U.S. Provisional Patent Application Ser. No. 62/514,173 filed on Jun. 2, 2017, the disclosure of which is expressly incorporated by reference herein in its entirety.

BACKGROUND OF THE INVENTION

In the roofing industry, cover strips are often used to bond two materials together, such as edge strips and roofing membranes. Typically, these are a 6-9 inches wide membrane strips coated with a pressure-sensitive adhesive layer. Traditional PVC roofing membranes contain a liquid phthalate plasticizer that will attack many traditional pressure-sensitive (PS) adhesives in the roofing market. Currently, no manufacturer supplies a PS cover strip product for PVC roofs. This is problematic for dealing with edge metal. Currently all edge metal used with PVC membrane roofs must be PVC coated to allow for non-PS PVC Flashing to be welded to the metal as well as the PVC roofing membrane. This limits the colors available for the metal. Finally, currently there is no easy way to tie-in a PVC roofing membrane to either EPDM or TPO membranes without a curb between the two membranes.

SUMMARY OF THE INVENTION

This invention provides a system of primers and PS adhesive that allows for a PS PVC cover strip to be produced which will adhere to a variety of substrates including PVC and KEE PVC membranes, metal edging, EPDM and TPO roofing membranes. The proposed construction of the PS PVC cover strip utilizes a series of primers that allow for a common roofing PS adhesive to be used with the PVC membranes. The first primer provides a layer of high plasticizer resistance. This prevents the plasticizer from the PVC membrane from attacking the PS adhesive. The second primer prepares the PVC surface for adhesion of the PS adhesive. The PS adhesive must be of significant construction to allow for conformation to step-offs, long-term performance, resistant to standing water and compatible with other common single-ply roofing materials.

DETAILED DESCRIPTION OF THE INVENTION

Figure 1:
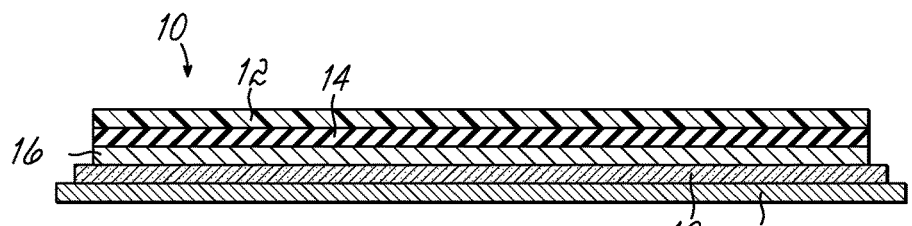
FIG. 1 is cross-sectional view of a cover strip according to the present invention.

As shown in FIG. 1, the present invention is a cover strip 10 which incorporates an upper PVC layer 12 of the type typically used in roofing applications, generally about 60 mils thick. The bottom surface of the PVC layer 12 is coated with a barrier layer 14 which prevents migration of plasticizers from the PVC layer 12. In turn, the barrier layer 14 is coated with a primer layer 16 which is in turn coated with a pressure-sensitive (PS) adhesive layer 18. Finally, the PS layer is covered with the silicone-coated release sheet 22. The cover strip will be 6-12 inches wide, typically 6-9 inches wide.

The barrier layer 14 is a layer that prevents migration of phthalate type plasticizers typically employed in PVC membranes. Generally, the barrier layer will be a polar polymer. One such polar polymer suitable for use in the present invention is an acrylonitrile rubber or NBR which is applied directly to the surface and PVC and allowed to set. Generally this will be 0.167 mils to 2.5 mils thick.

The composition of the primer will be determined by the composition of the pressure-sensitive adhesive. Generally the primer will be 0.2 mils to 0.6 mils thick. The pressure-sensitive adhesive can be any pressure-sensitive adhesive typically used in roofing applications such as bromobutyl rubber, pressure-sensitive adhesive and the like. Other suitable pressure-sensitive adhesives may be based on butyl, polyisobutylene, halobutyl, or other suitable polymers. The primer will generally be of a similar composition but with reduced solids content. The primer is simply applied to the barrier layer 14 and allowed to set. Then the pressure-sensitive adhesive layer 18 and release sheet 22 are laminated to the primer layer 16.

Figure 2:
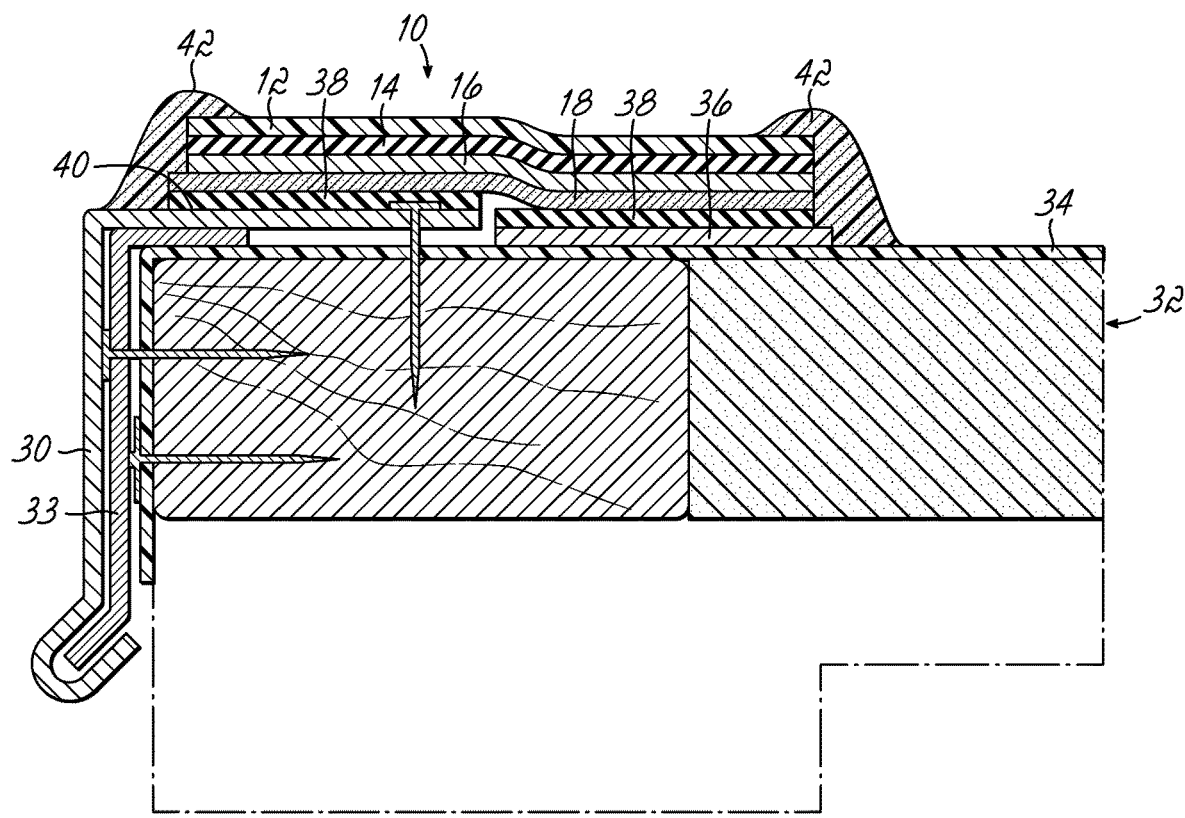
FIG. 2 is a cross-sectional view of the cover strip of the present invention for use with an edge termination.

FIG. 2 shows the use of the present invention to apply a rigid edge member 30 to a roof surface 32 which is covered with a PVC membrane 34. In this application, the PVC membrane 34 is applied to the roof 32 as would be typically done during the roofing application. A connector strip 33 is nailed to a corner of roof 32. The edge termination strip 30 engages to connector strip 33 at one edge and is nailed to the roof 32, trapping the PVC membrane between the roof surface and the edge treatment 30. The edge treatment 30 in this application is not coated with a PVC coating, but rather may be a painted metal surface or the like. Basically, in this application, any non-PVC coated edge treatment can be used.

The cover strip 10 is applied over the edge treatment 30 and over the PVC membrane 34. A strip barrier coating 36 which is generally the same as barrier coating 14 and a primer coating 38 (again the same as primer coating 16 in FIG. 1) are applied to PVC membrane 34. The release sheet 22 is removed from the cover strip 10 and the cover strip 10 applied over the barrier and primer-coated portion of the PVC 34 and directly onto the upper surface 40 of edge treatment 30. Sealants 42 can be applied at either edge of the cover strip 10 to provide a further water barrier, but are not necessary. The pressure sensitive-adhesive layer 18 will bond directly to surface 40 of the edge treatment using primer layer 38 and further bonds to the PVC 34, which is coated with a separate barrier layer 36 and separate primer layer 38.

Figure 3:
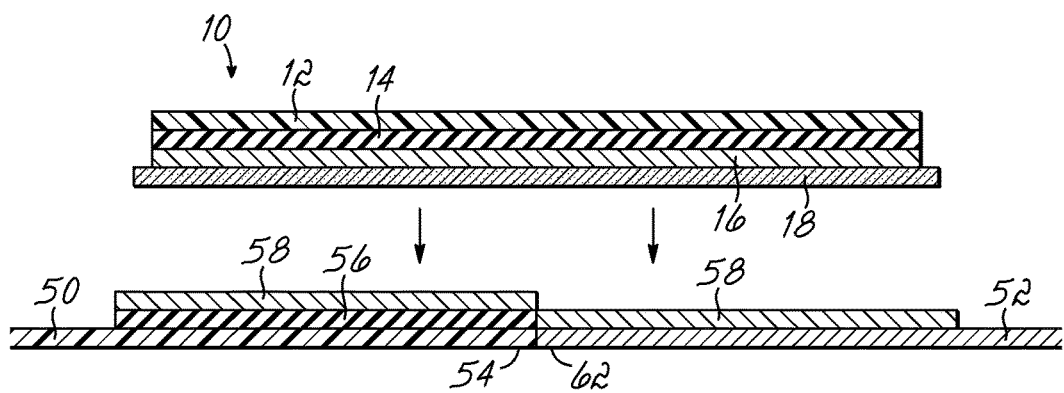
FIG. 3 is a cross-sectional view partially exploded, showing the application of the cover strip to a PVC membrane and a non-PVC membrane.

FIG. 3 shows an alternate use of the present invention in which the cover strip 10 is used to bond a PVC membrane 50 to a non-PVC membrane 52, such as TPO, EPDM or the like. The edge 54 of the PVC membrane 50 is first coated with a strip of barrier layer 56 and subsequently a primer layer 58. The non-PVC membrane 52 does not require a barrier layer, as it does not include plasticizers. But a strip of primer 58 is applied to the edge 62 of membrane 52 to improve adhesion to the PSA. The cover strip 10 is simply applied directly to the edge portions of the two membranes. The pressure-sensitive adhesive 18 will bind to the primer layer 58 on the PVC layer and bond directly to the surface of the non-PVC membrane 52. Further the pressure-sensitive adhesive on the cover strip is protected from the plasticizers present in the PVC. Further, no welding is required to form any bonds.

This has been a description of the present invention, along with the preferred method of practicing the present invention. The invention itself, however, should be defined only by the appended claims wherein we claim:

What is claimed is:

1. An edge treatment for a roof, wherein said roof is coated with a PVC membrane, said edge treatment comprising:
   a metal facia strip fixable to said roof to trap said PVC membrane between said metal facia strip and said roof; and
   a cover strip to bond said metal facia strip to said PVC membrane;
   wherein said cover strip includes a PVC layer having a bottom surface covered with a barrier layer effective to prevent plasticizer migration;
   wherein said barrier layer is in turn coated with a pressure-sensitive adhesive layer and said pressure-sensitive adhesive layer is bonded to said metal facia strip and positioned on said cover strip to bond to said PVC membrane.

2. The edge treatment of claim 1 wherein said barrier layer is an acrylonitrile rubber.

3. The edge treatment of claim 1 wherein said pressure sensitive adhesive is a bromobutyl rubber.

4. The edge treatment of claim 1 wherein the barrier layer is an acrylonitrile rubber and the pressure sensitive adhesive is a bromobutyl rubber.

5. A roof surface comprising:
   said edge treatment of claim 1 fixed to said roof with said PVC membrane between said roof and said edge treatment.

6. The edge treatment of claim 1 wherein said barrier layer is 0.167 mils to 2.5 mils thick.

7. The edge treatment of claim 1 further including a primer layer between said barrier layer and said pressure-sensitive adhesive layer wherein said primer layer is 0.2 mils to 0.6 mils thick.

8. The edge treatment of claim 1 wherein said metal facia strip is L-shaped and is fixed to an edge of said roof.

9. The edge treatment of claim 1 further including a strip barrier coating on said PVC membrane and a primer layer on said strip barrier coating with said pressure-sensitive adhesive layer of said cover strip contacting said primer layer.

10. The edge treatment of claim 9 further including a primer layer between said barrier layer and said pressure-sensitive adhesive layer of said cover strip.

11. The edge treatment of claim 1 wherein said pressure-sensitive adhesive layer extends from one edge at which said pressure-sensitive adhesive layer is positioned to bond to said metal facia strip to an opposing edge of said cover strip at which said pressure-sensitive adhesive layer is positioned to bond to said PVC membrane.

12. A roof surface comprising:
   a PVC membrane adjacent a non-PVC membrane, wherein the PVC membrane is bonded to the non-PVC membrane by a cover strip,
   wherein said cover strip includes a PVC layer in turn coated with a barrier layer and a pressure-sensitive adhesive layer; and
   wherein an edge portion of the PVC membrane is covered with a strip of barrier layer and the edge portion of the PVC membrane and an edge portion of the non-PVC membrane are covered with a primer layer, and the pressure-sensitive adhesive layer is bonded to the primer layer on each of the edge portions.

* * * * *